United States Patent Office 3,598,702
Patented Aug. 10, 1971

3,598,702
MICROBIOLOGICAL PROCESS FOR THE PREPARATION OF PIGMENTING PRODUCTS
Giovanni Franceschi and Arpad Grein, Milan, Italy, assignors to Societa' Farmaceutici Italia, Milan, Italy
No Drawing. Filed Nov. 14, 1968, Ser. No. 775,949
Claims priority, application Italy, May 14, 1968,
16,443A/68
Int. Cl. C12d 13/02
U.S. Cl. 195—28      4 Claims

ABSTRACT OF THE DISCLOSURE

Described is a microbiological process for the preparation of isorenieratenes of the class consisting of isorenieratene, 3 - oxy-isorenieratene and 3,3'-dioxy-isorenieratene. The process is characterized in that the new microorganism *Streptomyces mediolani* is grown, under aerobic conditions and in submerged culture, in a liquid cultural medium containing a carbon and a nitrogen source and mineral salts. The mycelium containing the pigmenting products is separated from the fermentation broth by filtration or centrifugation, and is usable as an animal foodstuff.

---

Our invention relates to a new process for the preparation of products having a pigmenting action. More particularly, the present invention relates to a microbiological process for the preparation of isorenieratenes of the class consisting of isorenieratene, 3-oxy-isorenieratene and 3,3'-dioxy-isorenieratene by means of the new microorganism *Streptomyces mediolani*.

Isorenieratene is a known product described in literature by Yamaguchi, Bull. Chem. Soc. Japan, 1957, 30, p. 111. 3-oxyisorenieratene and 3,3'-dioxy-isorenieratene are described in Belgian Patent 687,906. The above products, particularly 3-oxy- and 3,3'-dioxy-isorenieratene, have a high pigmenting action and are therefore employed as zootechny. These products are prepared, according to literature, by rather complicated chemical synthesis.

We have surprisingly found a microbiological process for the preparation of such compounds which, besides giving good yields, is much simpler and economically more advantageous than the known chemical synthesis. In fact, for the use of the products thus obtained in zootechny, it is not necessary to carry out a separation and purification of the products, but the mycelium "in toto" containing the pigmenting products may be directly employed as an additive to the commonly used animal diets.

*Streptomyces mediolani*, designated as strain 2215/74 F.I. of the Farmitalia strain collection, has been deposited at the Institute of Plant Pathology of the University of Milan where it received the number I.P.V. 1952, and at the Institute of Microbiology of Rutgers University, where it received the number I.M.R.U. 3934. The strain is freely available from the Institute of Plant Pathology.

The microorganism shows the following microscopic and biochemical morphological characteristics.

MICROSCOPIC ASPECT

On the common cultural media, the vegetative mycelium is formed by more or less thin hyphae, 0.4–0.9$\mu$ thick, long and abundantly branched which form larger hyphae, 1–1.3$\mu$ thick, long and straight. From these hyphae, hyphae forming spores or sporophores monopodially branch out, which are straight or slightly winding, long, formed by little chains of spores which are first bound, then free. The spores have a smooth prevalently cubic form, and sometimes are also cylindrical and roundish. On microscopic examination, they appear as characteristic little cubes, with sizes of 0.9–1.1 by 0.9–1.1$\mu$.

MACROSCOPIC ASPECT

Table 1 gives the cultural properties noticed on the indicated media, in which the microorganism is grown at 28° C. Obervations were made at the 3rd, 8th, 15th and 20th day after inoculation. The microorganism shows substantially a rapid and abundant growth with the formation of a compact, solid vegetative mycelium as a smooth patina, from yolk yellow to orange yellow colored. The aerial mycelium is also abundant on all the cultural media, with a rather cottony aspect, from vanilla yellow to pink yellow or beige yellow colored. No remarkable differences are noted in the aspect of the microorganism grown on synthetic or organic media.

BIOCHEMICAL PROPERTIES

Proteolysis of gelatine: positive.
Reduction of nitrates to nitrites: positive.
Hydrolysis of starch: positive.
Milk is not coagulated, but peptonized.
Production of melamine: negative.
Decomposition of tyrosine: positive.
Production of hydrogen sulphide: positive.

The microorganism produces no soluble pigments.

The following carbon sources are utilized: glucose, l-arabinose, saccharose, d-xylose, d-mannitol, d-fructose, maltose, ramnose and glycerine; however, it does not utilize meso-inositol and raffinose.

TABLE 1

| Medium | Growth | Aerial mycelium | Vegetative mycelium | Soluble pigment |
|---|---|---|---|---|
| Bennet's agar [1] | Abundant, in smooth patina. | Abundant, slightly cottony, vanilla yellow with beige or rose shades. | Yolk yellow or apricot yellow; same backside. | Absent. |
| Czapeck's agar [1] | Moderate, in smooth patina. | Abundant, cottony; vanilla yellow with beige-gray shades. | Lemon yellow to apricot yellow; same backside. | Do. |
| Asparagine-glucose agar [1] | Abundant in smooth patina. | Moderate, smooth vanilla yellow. | Lemon yellow; same backside. | Do. |
| Glycerine-glycine agar [1] | Abundant, in slightly folded patina. | Abundant, cottony; from rose yellow to clearly beige. | Apricot yellow; same backside. | Do. |
| Emerson's agar [1] | Abundant, in creasy patina. | Scanty, smooth, white-cream. | Orange yellow; same backside. | Do. |
| Starch agar and salts [2] | Abundant, in smooth patina. | Abundant, cottony; from pink yellow to light beige. | do. | Do. |
| Potato agar [3] | do. | Abundant, from dusty to cottony; pink yellow with light beige shades. | do. | Do. |
| Oats agar [4] | do. | Abundant, rather smooth, dusty; powder rose yellow. | Light orange yellow; same backside. | Do. |
| Asparagine-glycerine agar [1] | do. | Abundant, cottony; from powder pink to light beige. | Orange yellow; same backside. | Do. |
| Glucose-yeast extract agar [1] | do. | Abundant, slightly cottony; from vanilla yellow to light beige. | Deep orange yellow; same backside. | Do. |
| Starch-peptone agar [1] | do. | Abundant, cottony; from yellow to light beige. | Orange yellow; same backside. | Do. |
| Potassium nitrate-peptone agar | do. | Moderate, rosy; vanilla yellow with powder pink shades. | Light orange yellow; same backside. | Do. |

[1] Waksman, S.A., "The Actinomycetes" vol. II (1961), pp. 328–334.
[2] Pridham, T.G., et al., Antibiotics Annual (1956–1957), pp. 947–953.
[3] Grein, A., et al., Giorn. Microbiol. 13, p. 299 (1965).
[4] Baldacci, E., et al., Giorn. Microbiol. 9, p. 39 (1961).

The microorganism does not grow at 50° C. and does not produce sclerotia.

In liquid submerged and shaken culture it produces isorenieratene, 3 - oxy-isorenieratene and 3,3'-dioxy-isorenieratene.

IDENTIFICATION OF THE MICROORGANISM

The properties shown by the microorganism under examination and previously described allow referring it to the genus Streptomyces Waksman et Henrici (Bergey's Manual of Determinative Bacteriology, 1957, pp. 774–775). The microorganism belongs to the Section *"Rectus-flexibilis,"* series "yellow" of Pridham et al. (Appl. Microbiol. 6, 1958, p. 52).

The colors of the vegetable mycelium and of the aerial mycelium do not allow referring it to any of the most famous subgeneric groups proposed by Waksman (The Actinomycetes, vol. II, p. 117, 1961), by Baldacci (Giorn. Microbiol. 6, 1958, p. 10), by Gause et al. (Zur Klassifizierung der Actinomyceten, 1958, p. 17), by Flaig et al. (Arch. Mikrobiol. 35, 105, 1960) and by Ettlinger et al. (Arch. Mikrobiol. 31, 326, 1958). A comparison between the properties of the microorganism under examination and those reported in literature for the species belonging to the series "Yellow" of Pridham et al., has shown that none of the latter has all the properties corresponding to those of the microorganism under examination.

Thus, it is concluded that the microorganism under examination cannot be identified with any of the species described in literature and is therefore considered a new species and has been called *Streptomyces mediolani.*

*Streptomyces mediolani* may be stored by successive inoculations on solid media or by lyophilization of a suspension of its spores in milk. The process according to the invention consists in culturing the new microorganism *Streptomyces mediolani*, in submerged culture, in a cultural medium containing a carbon and nitrogen source and mineral salts. More particularly, the microorganism is cultured on a liquid cultural medium under aerobic conditions at a temperature between 24° C. and 37° C., preferably at 27° C., over a period of from 72 to 160 hours. The pH may vary according to the media employed, from 6 to 8.

Glucose, dextrine, starch, various meals (maize meal, soya meal, wheat meal, etc.), corn steep liquor and other substances usually employed can be utilized as the carbon source. The nitrogen source, besides the above-mentioned complex substances containing nitrogen, may be casein, cotton seeds meal and ammonium salts, such as ammonium sulphate, phosphate, chloride and other substances commonly used. The mineral salts useful for the production of the carotenoids vary according to the medium employed. For example, sodium, potassium, magnesium, iron, zinc, copper and cobalt, chlorides, sulphates or phosphates, calcium carbonate and others commonly used can be employed.

The fermentation may be carried out in flasks or in laboratory or industrial fermenters of various capacity. When the fermentation is over, the mycelium is separated from the culture broth by filtration or centrifugation and the pigmenting products contained are isolated by extraction with a suitable organic solvent miscible or immiscible in water such as methanol, chloroform, acetone or methylene chloride. The separation of each product is carried out by chromatography according to known techniques.

The products obtained by the process of the invention can be employed in zootechny and their high pigmenting power has been shown particularly useful when they are given to poultry. The products are added as such or in mixture with feeds or, preferably, the mycelium obtained from the fermentative process can be directly employed. In the first case, the pigmenting product is mixed with one of the ingredients of the diet commonly used for feeding. If the mycelium, separated from the culture broth, is utilized, it is dried with hot air or in vacuum and then milled. The powder thus obtained is deeply mixed with the foodstuff commonly employed. The quantity of pigmenting product which is added to foodstuffs may vary according to the desired pigmentation and according to the optional presence of natural pigmenting elements. Preferably it may be from 0.3 to 6 g. per quintal of foodstuff.

The pigmenting action of the products obtained by the process of the invention has been determined by the color intensity of the yolks measured according to the colorimetric scale "Roche" (see Mainguy, P., et al., "La couleur vitelline," ed. Hoffman La Roche).

The test had been carried out on 30 laying hens, 7 months old, each being in a single cage and divided in three groups of 10. The treatment was carried out according to the following scheme:

Group: Treatment
1 _____ Basic diet containing a small quantity of total pigments corresponding to 13.89 mg./kg.
2 _____ Basic diet + dehydrated lucerne corresponding to a content of total pigment pigments of 1500 mg./q. of mixture.
3 _____ Basic diet + mycelium corresponding to a content of total pigment of 1500 mg./q. of mixture.

The composition of the basic diet was as follows: (The values indicate the percentages by weight)

| | |
|---|---:|
| Hybrid maize | 39.00 |
| Oats | 17.60 |
| Wheat bran | 12.00 |
| 44% soya meal | 15.00 |
| Meat meal | 3.00 |
| Fish meal | 3.00 |
| Torula yeast | 1.00 |
| Dl-methionine | 0.10 |
| Sodium phosphate | 0.70 |
| Calcium carbonate | 6.30 |
| Sodium chloride | 0.30 |
| Pork fat | 1.00 |
| "Farcomplex" | 1.00 |

"Farcomplex" is a mixture of vitamins and oligoelements having the following composition (the values refer to 1 kg. of the same mixture):

protected vitamin A—750,000 U.I.
protected vitamin $D_3$—150,000 U.I.
protected vitamin E—500 U. I.
vitamin $B_2$—0.4 g.
vitamin $B_{12}$—0.0024 g.
vitamin $K_3$—0.1 g.
vitamin PP—2.5 g.
pholic acid—0.015 g.
d-calcium pantothenate—1 g.
dl-methionine—40 g.
coline chloride—100 g.
chlorotetracyclin hydrochloride—2 g.
iodine—0.1 g.
manganese—7 g.
zinc—5 g.
hydroxybutyltoluene—10 g.
unknown growth factors to—1.000 g.

In groups 2 and 3, the dehydrated lucerne and the mycelium have substituted similar quantities of wheat bran. The test lasted 30 days and has been divided in two periods:

(1) Preexperimental period (10 days) wherein all the subjects have been fed "ad libitum" with the basic diet containing no lucerne;

(2) Experimental period (19 days) wherein the subjects have been fed as above described.

During the experimental period and on alternate days the pigmentation of the yolk has been measured. The following Table 2 reports the minimum, average and maximum results.

TABLE 2

| Groups | Experimental period Roche scale | | |
|---|---|---|---|
| | Minimum | Average | Maximum |
| 1 | 7.00 | 7.30 | 7.80 |
| 2 | 7.46 | 8.45 | 9.14 |
| 3 | 7.06 | 9.99 | 11.88 |

The following examples are to illustrate the invention without limiting it.

Example 1

The sporulated surface of a 10 day old culture of *Streptomyces mediolani*, grown in a test tube on agar-potato glucosate at 28° C., was removed and collected in 4 ml. of sterilized distilled water. 0.5 ml. of this suspension were used to inoculate a 300 ml. flask containing 60 ml. of the following medium:

| | Percent |
|---|---|
| Dextrine | 4 |
| Casein | 1 |
| Calcium carbonate | 0.5 |
| Ammonium sulphate | 0.1 |
| Bipotassium phosphate | 0.01 |
| Corn steep liquor | 1 |
| Tap water to 100 ml. | |

Sterilization was carried out by heating in an autoclave at 120° C. for 20 minutes.

pH of the medium was 6.9 after sterilization.

The flask was incubated at 28° C. for 26 hours on a rotary shaker at 225 r.p.m. with a stroke of 3 cm.

2 ml. of a culture thus obtained were used to inoculate 300 ml. flasks containing 60 ml. of the same medium, sterilized as described above. It was incubated under the above conditions. After 120 hours of fermentation, a production of 500γ of pigmenting products per ml. of culture broth was obtained.

Example 2

The operation was as in Example 1 with the difference that the medium employed for the productive phase had the following composition:

| | Percent |
|---|---|
| Insoluble starch | 4.5 |
| Soya meal | 2.25 |
| Corn steep liquor | 2.35 |
| Sodium chloride | 0.5 |
| Calcium carbonate | 0.35 |
| Tap water to 100 ml. | |

After 120 hours of fermentation, a production of 600γ of pigmenting products per ml. of culture broth was obtained.

Example 3

The operation was as in Example 1 with the difference that the medium employed for the productive phase had the following composition:

| | Percent |
|---|---|
| Glucose | 0.3 |
| Cotton seeds meal | 0.4 |
| Soluble starch | 7 |
| Calcium carbonate | 1.2 |
| Ammonium sulphate | 0.75 |
| Corn steep liquor | 2.35 |
| Tap water to 100 ml. | |

After 120 hours of fermentation, a production of 900γ of pigmenting products per ml. of culture broth was obtained.

Example 4

The operation was as in Example 1 with the difference that the medium employed for the productive phase has the following composition:

| | Percent |
|---|---|
| Soluble starch | 4 |
| Casein | 1 |
| Soya meal | 3 |
| Beet molasses | 0.2 |
| Calcium carbonate | 0.4 |
| Magnesium sulphate | 0.1 |
| Tap water to 100 ml. | |

After 69 hours of fermentation, a production of 700γ of pigmenting products per ml of culture broth was obtained.

Example 5

Three 300 ml. flasks containing 60 ml. of the medium described in Example 1 were inoculated with a 20 day old culture of *Streptomyces mediolani*, grown on the medium and under the conditions described in Example 1. The flasks were incubated at 28° C. for 26 hours under the conditions described in Example 1.

170 ml. of the culture broth thus obtained were inoculated in 3000 ml. of the same liquid medium, contained in a 5 l. fermenter provided with a screw-stirrer, an inlet tube for bubbling in air ending under the screw-stirrer, a breakwater device, tubes for inoculation, air outlet tubes and temperature checking equipment. The operation was carried out at 28° C. with an aeration rate of 3 liters per minute and under stirring with a rate of 400 r.p.m. During fermentation, foaming was checked by adding small quantities of silicone antifoaming agent. The maximum yield of pigmenting products was obtained after 77 hours of fermentation. This was 500γ per ml. of culture broth.

10 liters of culture broth were filtered with 2% of Hyfle Supercel (registered trademark), the filtrate was eliminated. The mycelium was suspended at room temperature in 3 l. of methanol and shaken. Three extractions were then carried out with 3 liters of a mixture of methanol-chloroform (1:1) each time. The combined extracts were repeatedly washed with water and the chloroform layer separated was dried over sodium sulphate and evaporated in vacuo at 35° C. The dark-red oily residue consists of a pigment complex. This residue was taken up with petroleum ether (300 cc.), and a brown-red solid separated by filtration weighs 1.5 g. The ethereal mother liquors were concentrated to about 100 ml. and were chromatographed over a column of neutral alumina, first by elution with petroleum ether to eliminate fats, then with petroleum ether containing 1% of acetone. The eluate of the large top band was concentrated to small volume and allowed to stand overnight in a refrigerator. 400 mg. of purple-red crystalline product melting at 200°–201° C. were separated. Adsorption maxima in the visible spectrum were at the following wavelengths.

(FRACTION A)

Solvent: $\lambda$ max. (m$\mu$)
Petroleum ether _____ (428), 448, 478
Benzene _____(440), 465, 495

By chromatography over a thin layer of silica gel, it has been found: Rf=0.85 (benzene) and Rf=0.38 (petroleum ether and 1% of acetone). This fraction A has been therefore identified as isorenieratene by chromatographic and spectrophotometric comparison and by melting point in mixture with a sample prepared by synthesis.

Continuing the elution of the column with petroleum ether containing 10% of acetone, a second band was collected. From the eluate concentrated to small volume, 200 mg. of a brick-red powder were obtained. This powder melting 180°–185° C. has adsorption maxima in the visible spectrum at the following wavelengths.

(FRACTION B)

| Solvent: | λ max. (mμ) |
|---|---|
| Petroleum ether | (425), 446, 745 |
| Benzene | (438), 463, 493 |

By chromatography on a thin layer of silica gel was obtained: Rf=0.47 (benzene) and Rf=0.7 (methylene chloride).

Fraction B is slightly soluble in the common organic solvents, while it is very soluble in alcoholic sodium carbonate with a bright red coloring and it was reprecipitated by acidification. By treatment with acetic anhydride in pyridine it gives a phenolic acetate $$(\nu_{KBr}^{cm^{-1}}\ 1215,\ 1758)$$

which is insoluble in alcoholic sodium carbonate.

This fraction has been identified with the 3-oxy-isorenieratene by chromatographic and spectrophotometric comparison and by melting point in mixture.

The brown-red solid (1.5 g.) previously collected from petroleum ether was chromatographed over a column of silica gel and eluted with benzene containing 10% of acetone. From the large tail band 600 mg. of a brick-red amorphous solid were obtained by evaporation of the solvent and successive treatment with petroleum ether. This solid melting at 200° C. (with decomposition) has adsorption maxima in the visible spectrum at the following wavelengths:

(FRACTION C)

| Solvent: | λ max. (mμ) |
|---|---|
| Petroleum ether | (425), 446, 475 |
| Benzene | (438), 463, 493 |

By chromatography on a thin layer of silica gel there was obtained: Rf=0.1 (benzene) and Rf=0.26 (methylene chloride).

This fraction C has been identified with the 3,3'-dioxyisorenieratene by chromatographic and spectrophotometric comparison and by melting point in mixture.

We claim:

1. A microbiological process for the preparation of isorenieratenes of the class consisting of isorenieratene, 3-oxyisorenieratene and 3,3'-dioxy-isorenieratene, which comprises growing the microorganism *Streptomyces mediolani*, under aerobic conditions and in submerged culture, in a liquid cultural medium containing a carbon and a nitrogen source and mineral salts, and separating the mycelium containing the pigmenting products from the fermentation broth.

2. The process of claim 1, wherein the fermentation is carried out at a temperature of from 24° C. to 37° C., over a period of from 72 to 160 hours at a pH between 6 and 8.

3. The process of claim 1, wherein the pigmenting products are separated from the mycelium of *Streptomyces mediolani*, which contains them, by solvent extraction and then isolated and purified by chromatography.

4. The process of claim 1, wherein the mycelium of the *Streptomyces mediolani*, separated from the fermentation broth, is dried and milled, so that it is suitable for addition to animal feeds.

References Cited 3,330,737   7/1967   Marnati et al. _____ 195—28

ALVIN E. TANENHOLTZ, Primary Examiner

U.S. Cl. X.R.

195—80; 99—9